(12) United States Patent
Henry et al.

(10) Patent No.: US 12,225,562 B2
(45) Date of Patent: *Feb. 11, 2025

(54) ADAPTIVE WIRELESS NETWORK FEATURE SUPPORT

(71) Applicant: Cisco Technology, Inc., San Jose, CA (US)

(72) Inventors: Jerome Henry, Pittsboro, NC (US); Sudhir Kumar Jain, Fremont, CA (US); Aries Kuttiyan, Bangalore (IN)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/359,511

(22) Filed: Jul. 26, 2023

(65) Prior Publication Data

US 2023/0371052 A1    Nov. 16, 2023

Related U.S. Application Data

(63) Continuation of application No. 17/690,612, filed on Mar. 9, 2022, which is a continuation of application
(Continued)

(51) Int. Cl.
*H04W 72/51* (2023.01)
*H04L 5/00* (2006.01)
(Continued)

(52) U.S. Cl.
CPC .......... *H04W 72/51* (2023.01); *H04W 24/02* (2013.01); *H04W 72/02* (2013.01); *H04W 84/12* (2013.01)

(58) Field of Classification Search
CPC ... H04W 72/048; H04W 24/02; H04W 84/12; H04W 72/02; H04L 5/0053; H04L 5/005
See application file for complete search history.

(56) References Cited

U.S. PATENT DOCUMENTS

| | | | |
|---|---|---|---|
| 7,925,206 B2 | 4/2011 | Jha | |
| 8,306,574 B2 * | 11/2012 | Warner | H04B 7/0608 455/562.1 |

(Continued)

FOREIGN PATENT DOCUMENTS

| | | | | |
|---|---|---|---|---|
| CN | 1805391 A | * | 7/2006 | ............ H04W 84/12 |
| CN | 101557589 A | * | 10/2009 | |

(Continued)

OTHER PUBLICATIONS

Cisco: "802.11r Fast Transition Roaming," 802.11r, 802.11k and 802.11w Deployment Guide, Cisco IOS-XE Release 3.3, Jul. 2015, 8 pages.

(Continued)

*Primary Examiner* — Asghar H Bilgrami
(74) *Attorney, Agent, or Firm* — Edell, Shapiro & Finnan, LLC (57) ABSTRACT

Techniques to adaptively support/enable a wireless network feature for certain wireless client devices without hampering the performance or connectivity of wireless client devices which do not support that wireless network feature. An access point or wireless network controller adaptively enables a wireless network feature without advertising support for the wireless network feature in a wireless network-standard compliant manner to allow one or more wireless clients that support the wireless network feature to use the wireless network feature when associated to the access point while enabling association of one or more wireless clients that do not support the wireless network feature.

20 Claims, 11 Drawing Sheets

Related U.S. Application Data

No. 16/864,707, filed on May 1, 2020, now Pat. No. 11,310,803, which is a continuation of application No. 15/660,427, filed on Jul. 26, 2017, now Pat. No. 10,687,338.

(60) Provisional application No. 62/530,393, filed on Jul. 10, 2017.

(51) Int. Cl.
*H04W 24/02* (2009.01)
*H04W 48/12* (2009.01)
*H04W 48/14* (2009.01)
*H04W 84/12* (2009.01)
*H04W 88/08* (2009.01)
*H04W 72/02* (2009.01)

(56) References Cited

U.S. PATENT DOCUMENTS

| | | | |
|---|---|---|---|
| 8,442,592 B2 | 5/2013 | Warner et al. | |
| 9,750,022 B2* | 8/2017 | Liu | H04W 72/0453 |
| 10,165,608 B2 | 12/2018 | Grayson et al. | |
| 2004/0008650 A1* | 1/2004 | Le | H04L 69/329 370/395.52 |
| 2007/0223434 A1* | 9/2007 | Bennett | H04W 74/00 370/338 |
| 2009/0323608 A1* | 12/2009 | Adachi | H04W 48/18 370/329 |
| 2011/0211517 A1* | 9/2011 | Moscibroda | H04H 20/63 370/312 |
| 2011/0211518 A1* | 9/2011 | Gupta | H04H 20/63 370/312 |
| 2013/0165081 A1* | 6/2013 | Wuthnow | H04W 4/12 455/411 |
| 2013/0176897 A1* | 7/2013 | Wang | H04W 12/06 370/254 |
| 2016/0212695 A1* | 7/2016 | Lynch | H04W 28/0268 |
| 2017/0048728 A1* | 2/2017 | Ngo | H04W 24/02 |
| 2017/0353283 A1* | 12/2017 | Hsu | H04B 7/0452 |

FOREIGN PATENT DOCUMENTS

| | | | | |
|---|---|---|---|---|
| CN | 106304000 B | * | 10/2020 | H04W 4/16 |
| WO | WO-2018054777 A2 | * | 3/2018 | H04L 63/0414 |

OTHER PUBLICATIONS

Harkins D., "PMK Caching for FILS," IEEE 11-14/0062r0, Jan. 2014, 9 pages, Retrieved from URL: https://mentor.ieee.org/802.11/dcn/14/11-14-0062-00-00ai-pmk-caching-preso.pptx.

"IEEE Standard for Information Technology—Telecommunications and Information Exchange Between Systems—Local and Metropolitan Area Networks—Specific Requirements, Part 11: Wireless LAN Medium Access Control (MAC) and Physical Layer (PHY) Specifications, Amendment 2: Fast Basic Service Set (BSS) Transition," IEEE Std 802.11™—2008 (Amendment to IEEE Std802.11™—2007 as amended by IEEE Std 802.11k™—2008), Jul. 15, 2008, IEEE Computer Society, pp. 101-126.

"IEEE Standard for Information Technology—Telecommunications and Information Exchange Between Systems—Local and Metropolitan Area Networks—Specific Requirements, Part 11: Wireless LAN Medium Access Control (MAC) and Physical Layer (PHY) Specifications, Amendment 2: Fast Basic Service Set (BSS) Transition," IEEE Std 802.11r™—2008 (Amendment to IEEE Std802.11™—2007 as amended by IEEE Std 802.11k™—2008), Jul. 15, 2008, IEEE Computer Society, 1-100 Pages.

* cited by examiner

ADAPTIVE WIRELESS NETWORK FEATURE SUPPORT

PRIORITY CLAIM

This application is a continuation application of U.S. application Ser. No. 17/690,612 filed Mar. 9, 2022, which is a continuation application of U.S. application Ser. No. 16/864,707 filed May 1, 2020, now U.S. Pat. No. 11,310,803, which is a continuation application of U.S. application Ser. No. 15/660,427, filed Jul. 26, 2017, now U.S. Pat. No. 10,687,338, which claims priority to U.S. Provisional Application No. 62/530,393, filed Jul. 10, 2017. All of these applications are incorporated herein by reference in their entireties.

TECHNICAL FIELD

The present disclosure relates to wireless networks.

BACKGROUND

In wireless local area networks, such as networks that operate according to the IEEE 802.11/Wi-Fi® wireless local area network (WLAN) standard, some wireless client devices (such as smartphones and tablets) in the field support certain (newer) features or functions of the standard, whereas other, older wireless client devices in the field, do not support those features. As an example, the IEEE 802.11r/Fast Transition (FT) is a feature that some wireless client devices do not support and consequently some wireless client devices fail to connect to an access point (AP) when FT is enabled by that AP in the wireless local area network (WLAN), even when FT is one option among others (hybrid WLANs where FT and standard Wi-Fi Protected Access 2 (WPA2) are supported). In other words, some wireless client devices are still able to associate to the AP, some fail to associate only if that feature (e.g., FT) is enabled and others fail to associate when a hybrid mode is support.

As a result, many WLANs supporting Robust Security Network (RSN) and mobile wireless devices still only implement standard WPA2, and do not implement FT even in hybrid mode, out of concern of wasting troubleshooting time when old wireless client devices try to join the WLAN.

What is desirable is a way to let some wireless clients capable of supporting a particular wireless network feature to benefit from that feature, without disrupting the connectivity or performance of older clients which do not support that wireless network feature.

DESCRIPTION OF EXAMPLE EMBODIMENTS

Overview

Presented herein are techniques to adaptively support/enable a wireless network feature for certain wireless client devices without hampering the performance or connectivity of wireless client devices which do not support that wireless network feature. An access point or wireless network controller adaptively enables a wireless network feature without advertising support for the wireless network feature in a wireless network-standard compliant manner to allow one or more wireless clients that support the wireless network feature to use the wireless network feature when associated to the access point while enabling association/connection of one or more wireless clients that do not support the wireless network feature.

DETAILED DESCRIPTION

Figure 1:
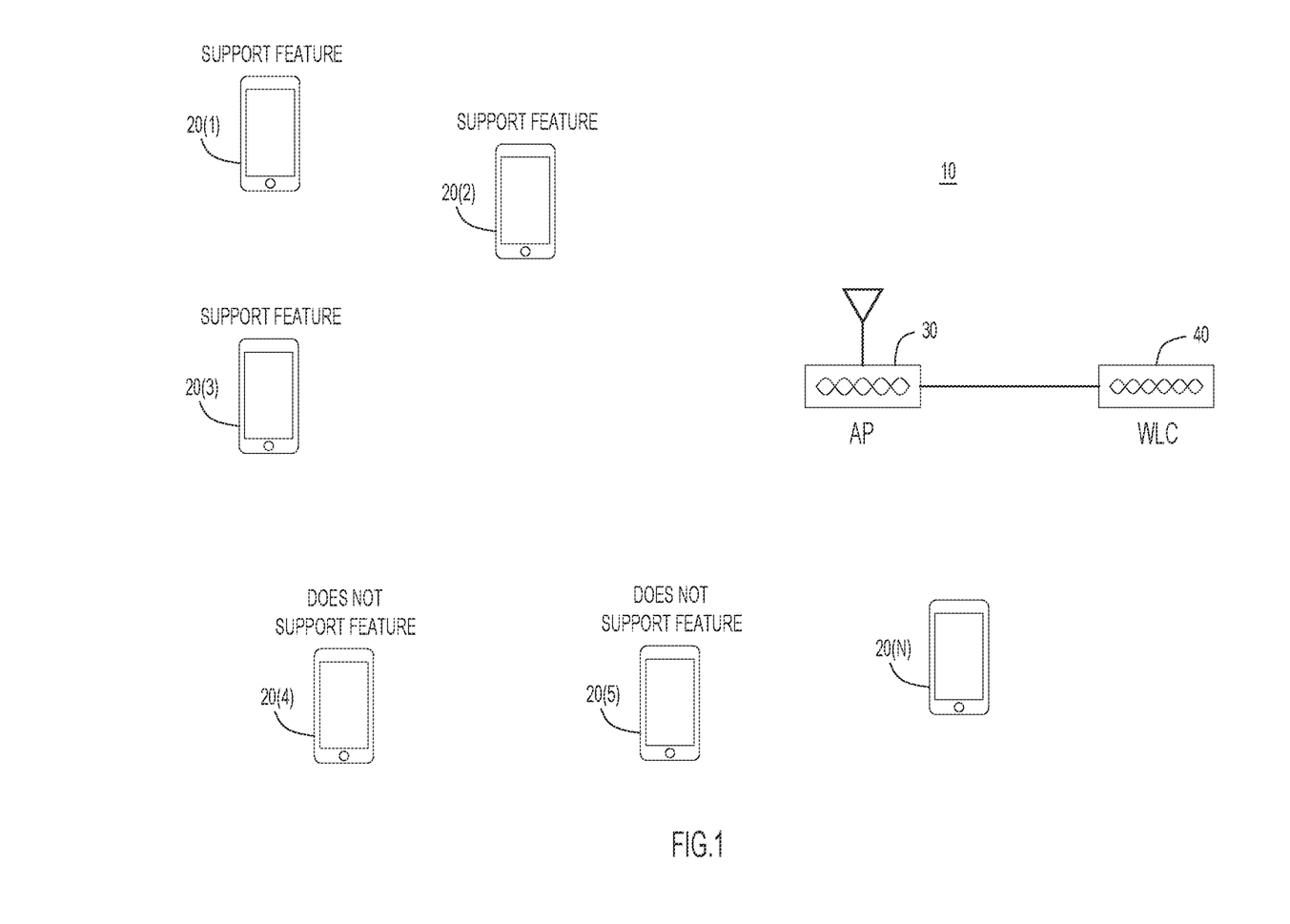
FIG. 1 is a block diagram of a wireless network configured to perform the adaptive feature enabling techniques presented herein, according to an example embodiment.

Referring first to FIG. 1, a diagram is shown of a WLAN 10 that includes a plurality of wireless client devices 20(1)-20(N), an AP 20 and a WLAN controller (WLC) 30. It should be understood that WLAN in real-world environments would have numerous APs and numerous WLCs, but a single AP is shown for simplicity only. In this example WLAN 10, the wireless client devices 20(1)-20(3) support a particular WLAN feature, and wireless client devices 20(4) and 20(5) do not support the particular WLAN feature. In one example, the particular WLAN feature is the IEEE 802.1r Fast Transition (FT) feature. Other examples of WLAN features for which these techniques may be employed include functionalities of IEEE 802.11k, 802.11v 802.11w, but in general these techniques are applicable to any feature that is incompatible with IEEE 802.11 standard modes.

In one example, the FT feature is typically enabled by turning on FT support in the WLAN, and advertising this support in beacons broadcasted by the AP, and in probe and association responses that are transmitted by the AP in response to a probe request form a client. The FT association procedure is used when a supporting client initiates an association request indicating support for FT, based on presence of the FT Mobility Domain Information Element (MDIE). The presence of the information element signifying support of the particular WLAN feature, e.g., FT, in frames returned to non-supporting clients is what is to be avoided.

Figure 2:
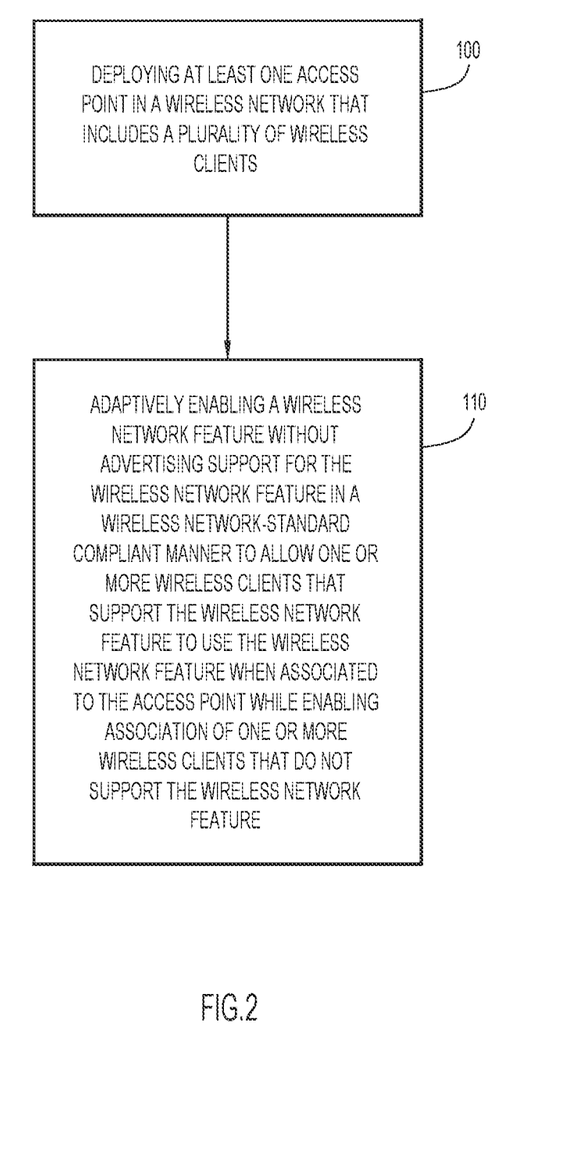
FIG. 2 is a high-level flow chart of a process to adaptively enabling a feature in a wireless network, according to an example embodiment.

FIG. 2 provides a high-level flow chart of a method 100 according to the embodiments presented herein. While the concepts are described herein as being used in connection with a WLAN, that is not meant to be limiting. In other words, these embodiments are applicable to any wireless network that operates in accordance with a wireless network standard that is now known or hereinafter developed. At 100, at least one wireless access point (AP) is deployed in a wireless network that includes a plurality of wireless clients. At 110, the AP (or wireless network controller) adaptively enables a wireless network feature without advertising support for the wireless network feature in a wireless network-standard compliant manner to allow one or more wireless clients that support the wireless network feature to use the wireless network feature when associated to the access point while enabling association of one or more wireless clients that do not support the wireless network feature.

Several embodiments are presented herein to enable a particular wireless network feature to be indirectly supported in the wireless network so as to allow certain clients to take advantage of that particular wireless network feature without adversely affecting the clients that do not support that particular wireless network feature. As an example, using the mechanisms presented herein in connection with FIGS. 3A, 3B and 4-6, indication of the particular wireless network feature (also called a "target feature") is hidden from beacons broadcasted by the AP. The target feature is enabled in the wireless network with an "adaptive" mode.

Figure 3A:
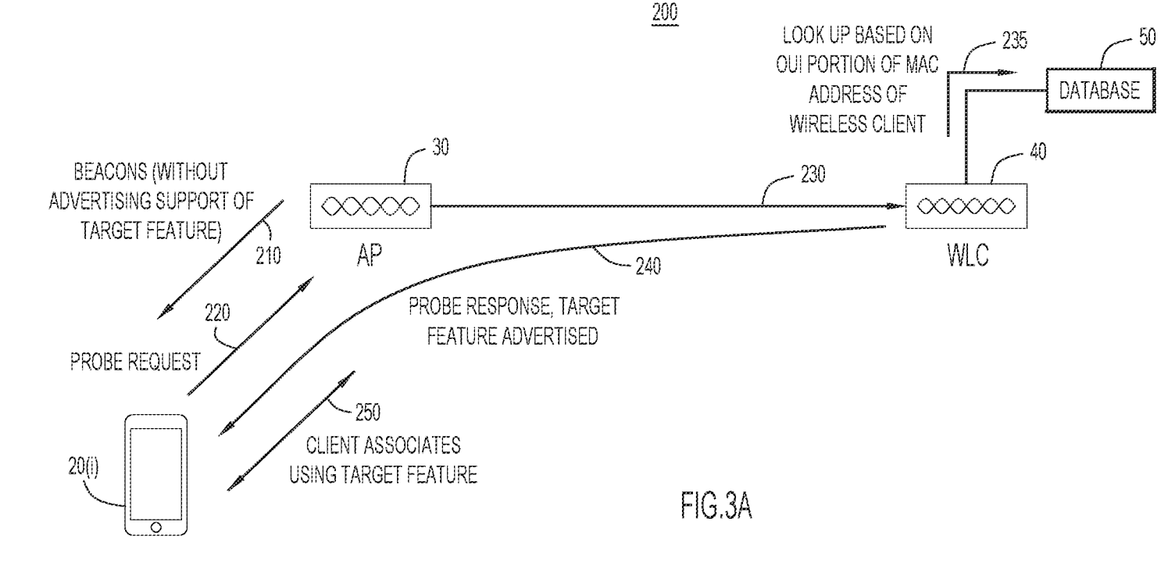
FIG. 3A is a diagram depicting an operational flow of a first adaptive feature enabling mechanism, according to an example embodiment.

Reference is now made to FIG. 3A. In one embodiment, the AP includes in a probe response that it transmits to a client, an information element signifying support for the target feature, but does not indicate support for the target feature in beacons that it broadcasts. In this embodiment, the WLC 40 accesses a database 50 that stores a list of vendors (based on the Organizational Unique Identifier (OUI) part of a Media Access Control (MAC) address) that support the target feature. The database 50 may be local or based in the cloud and accessed by the WLC 40 via a network (not shown in FIG. 2 for simplicity).

The process is shown at 200 in FIG. 3A. As indicated at 210 in FIG. 3A, the AP broadcasts beacons, but does not advertise support for the target feature in standard 802.11 fields in the beacons. For example, there is no FT mode in the RSN IE of the beacons transmitted at 210. At 220, a client (generically identified by reference numeral 20(i)) transmits a probe request to the AP 30. After the AP 30 receives the probe request, at 230 the AP 30 forwards it to the WLC 40.

At 235, the WLC then runs a Media Access Control (MAC) address lookup in the database 50, to verify if the Organizational Unique Identifier (OUI) part of the MAC address of the client 20(i) is present in the database 50. This database 50 can be maintained internal to the WLC 40 (with manual or automatic updates) or external to the WLC (stored in the cloud, for example) and accessed by the WLC 40 when needed, as described above. If the client's OUI part is found in the database 50 indicating that it is from a vendor of clients supporting the target feature (e.g., FT), then at 240 the WLC 40 generates, or instructs the AP 30 to generate, a probe response that advertises support for the target feature (e.g., FT) by including the appropriate information element (e.g., the FT MDIE) in the probe response. The AP transmits that probe response. When a client that supports the feature receives the probe response that contains the appropriate information element (indicating support of the target feature), at 250, the supporting client will detect information element and associate with the AP 30 using the target feature. For example, in the case of FT, the client will go through FT association with the AP. Conversely, if the OUI part of the client's MAC address is not found in the database 50, then the probe response transmitted by the AP will not include the appropriate information element indicating support of that target feature, and the client 20(i) will associate in the normal manner with the AP. No modification is needed to the clients in the embodiment of FIG. 3A.

Figure 3B:
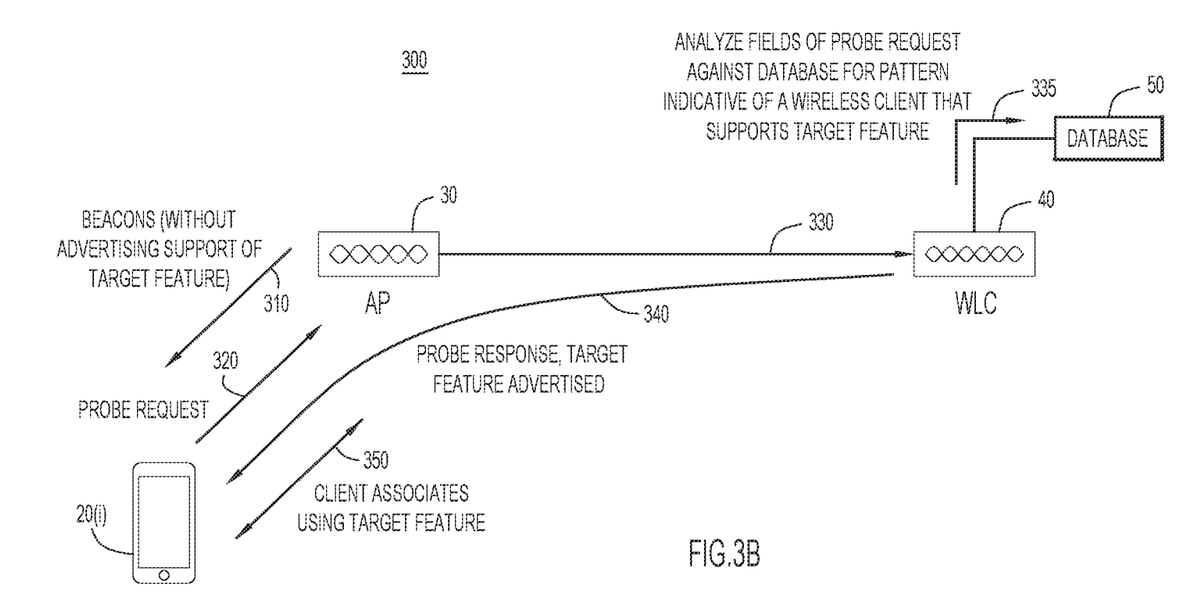
FIG. 3B is a diagram depicting an operational flow of a second adaptive feature enabling mechanism, according to an example embodiment.

Reference is now made to FIG. 3B for description of a process 300 according to another embodiment. In this embodiment, the WLC 40 does not look up the OUI directly, but compares fields present in the probe request against a database of clients probe requests, in search for a signature or a pattern identifying a client type. The search can be any combination of relevant parameters. For example, the pattern or combination of parameters may be one in which clients of type A, from vendor B support the particular WLAN feature (FT), and their probe requests always enable information elements X, Y and Z) in a probe request, which individually or together are sufficient to recognize clients of type A with a high enough probability. Thus, in this embodiment, the database 50 stores a signature or pattern identifying a client type that is known to support the target feature. The overall flow of process 300 in FIG. 3B is similar to that of FIG. 3A, except the specific mechanism to declare that a client supports the particular WLAN feature uses the pattern matching of the probe request parameters rather than matching based on OUI. That is, at 310, the AP 30 transmits beacons without advertising support of the target feature. At 320, the client 20(i) transmits a probe request. At 330, the AP forwards the probe request to the WLC 40. At 335, the WLC analyzes fields of the probe request from the client 20(i) to determine if it has the signature or pattern of fields (i.e., a fingerprint) indicating that the client 20(i) or the WLAN chipset that the client 20(i) uses is recognized to support the target feature.

When clients are recognized that support the target feature, then a probe response is generated that mentions support for the target feature by the appropriate Information Element, as indicated at 340. That is, the WLC 40 generates, or instructs the AP 30 to generate, a probe response with advertised support for the target feature. The supporting client will then go through association using the target feature at 350. No modification is needed to the clients in the embodiment of FIG. 3B.

With regard to the database 50 shown in the embodiments of FIGS. 3A and 3B, a database is already present in most WLCs. Such a database is typically used to create what is called "device profiles". The mechanisms of FIGS. 3A and 3B involve adding that pre-existing database the aforementioned information to adaptively enable the target feature. OUI databases are maintained in a public repository that can be fetched on demand if a new device with an unknown OUI is detected. Some learning about the device support for the first device of a given type to join a network may take place, but the device type and support would then be added to the database.

Figure 4:
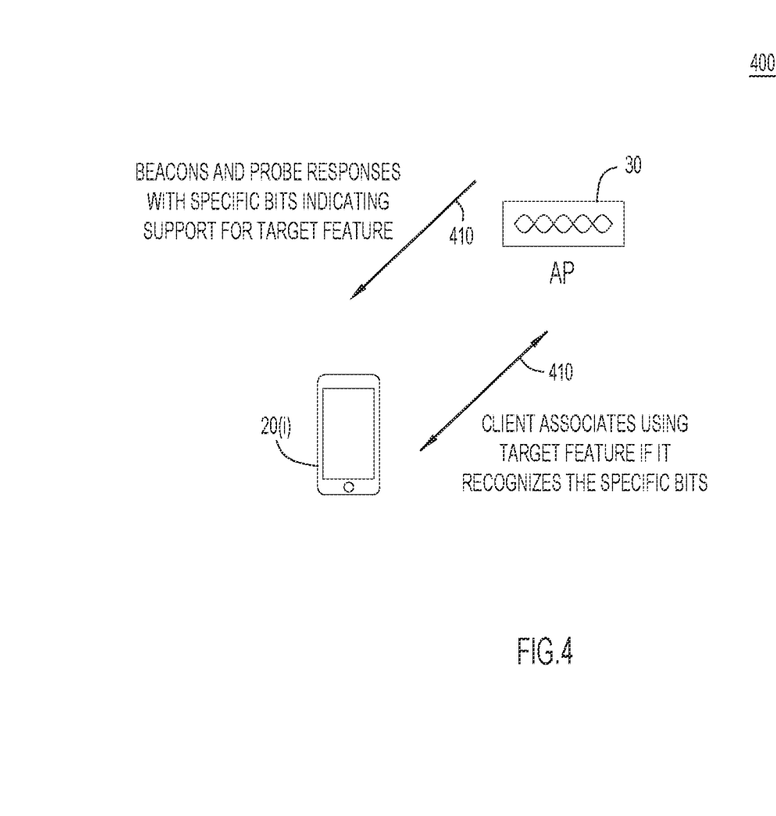
FIG. 4 is a diagram depicting an operational flow of a third adaptive feature enabling mechanism, according to an example embodiment.

Reference is now made to FIG. 4 for description of a process 400 according to yet another embodiment. In the embodiment of FIG. 4, indication of support of target feature is not present in the probe response, and the beacons broadcasted by the AP also do not indicate support of the target feature in the manner defined by the standard. The probe request is handled at the AP. No OUI lookup is performed, and the probe response does not indicate support for the target feature in the standard manner. Instead, support for the target feature is indicated through bits in a vendor-specific field present in the Beacons and/or Probe Responses transmitted by the AP 30. Clients that are to support the target feature are specifically configured to recognize the bits in the vendor-specific field of Beacons and Probe Responses as indicating that the AP supports the target feature.

Set forth below is a table indicating an example of the specific bits.

| Size | Value (hex) | Description |
|---|---|---|
| Uint8 | DD | Vendor specific element identifier (ID) |
| Uint8 | 05 | Length (variable value subject to change) |
| Uint8 | | Extended capability field Bit X indicates target feature (e.g., FT) support for compatible devices |

Thus, as shown at 410 in FIG. 4, the AP 30 includes a specific Information Element in Beacons that are broadcasted and Probe Responses that are transmitted (unicast), the specific information element allowing a supporting client to recognize that the AP supports the target feature. The AP 30 does not advertise support for the target feature in standard 802.11 fields (for example, FT mode in the RSN information element), but only in the proprietary field vendor-specific field, through specific bits expressing support of the target feature/mode.

At 420, the client recognizes the presence and significance of these bits in the vendor-specific field, and proceeds to the association phase using the target feature(s), even though the target feature(s) was/were not advertised specifically/clearly (in the standard compliant manner) in the AP Beacons/Probe Responses. For example, the Beacons and Probe Responses sent by the AP do not include the FT RSN IE, but the client understood from the presence of the specific bits in the proprietary information element field that the AP supports FT.

In the embodiment of FIG. 4, although the probe response security mechanisms did not expose the target feature, supporting clients implement a slight deviation from the 802.11 standard, and still invoke the target feature, (e.g., undergo an FT association), having recognized that the AP does support the target feature. However, clients that do not recognize the specific bits and their significance, associate in the normal manner with the AP 30, without using the target feature.

Figure 5:
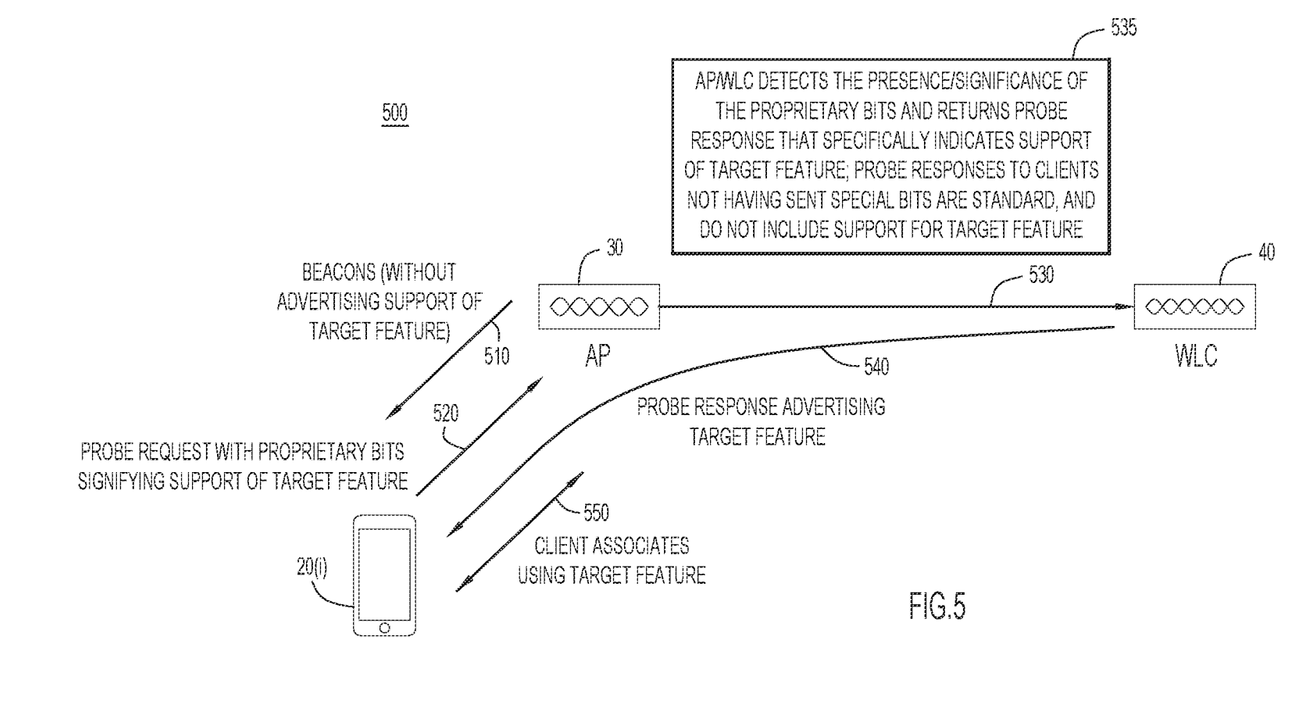
FIG. 5 is a diagram depicting an operational flow of a fourth adaptive feature enabling mechanism, according to an example embodiment.

Reference is now made to FIG. 5. FIG. 5 illustrates a process 500 according still another embodiment in which the client embeds a vendor-specific Information Element in its Probe Requests. Bits in this Information Element are set to signify support for the target feature. The AP recognize these bits, and returns a Probe Response that contains information about support for the target feature. The client then invokes that target feature, e.g., undergoes FT association. Thus, as shown at 510, the AP broadcasts Beacons in the standard manner, and does not advertise support for the feature in standard 802.11 fields in Beacons (no FT mode in RSN information element, for example). At 520, the client transmits a Probe Request that includes proprietary bits to signify support for the target feature (e.g. FT). Examples of the proprietary bits are the same as those described above in connection with FIG. 5. At 530, the AP/WLC receives the Probe Request, and at 535 detects the presence and significance of the proprietary bits included in the Probe Request. At 540, the AP/WLC returns a Probe Response directly indicating (in the standard compliant manner, that is, with the appropriate feature-specific information element) support of the target feature (e.g. FT). Probe Responses to clients not having the special bits are standard, and thus do not indicate support for target feature. At 550, the client associates to the AP using the target feature, e.g., associates to the AP using FT. In the embodiment of FIG. 5, the specific/proprietary bits may take a form similar to that shown in FIG. 4 and described above. Thus, for the embodiment of FIG. 5, the clients that are to support the target feature are specifically configured to include the proprietary bits in Probe Requests to APs. Since the AP's answer to a Probe Request is unicast, the Probe Response in this case will not affect clients that do not support FT.

Figure 6:
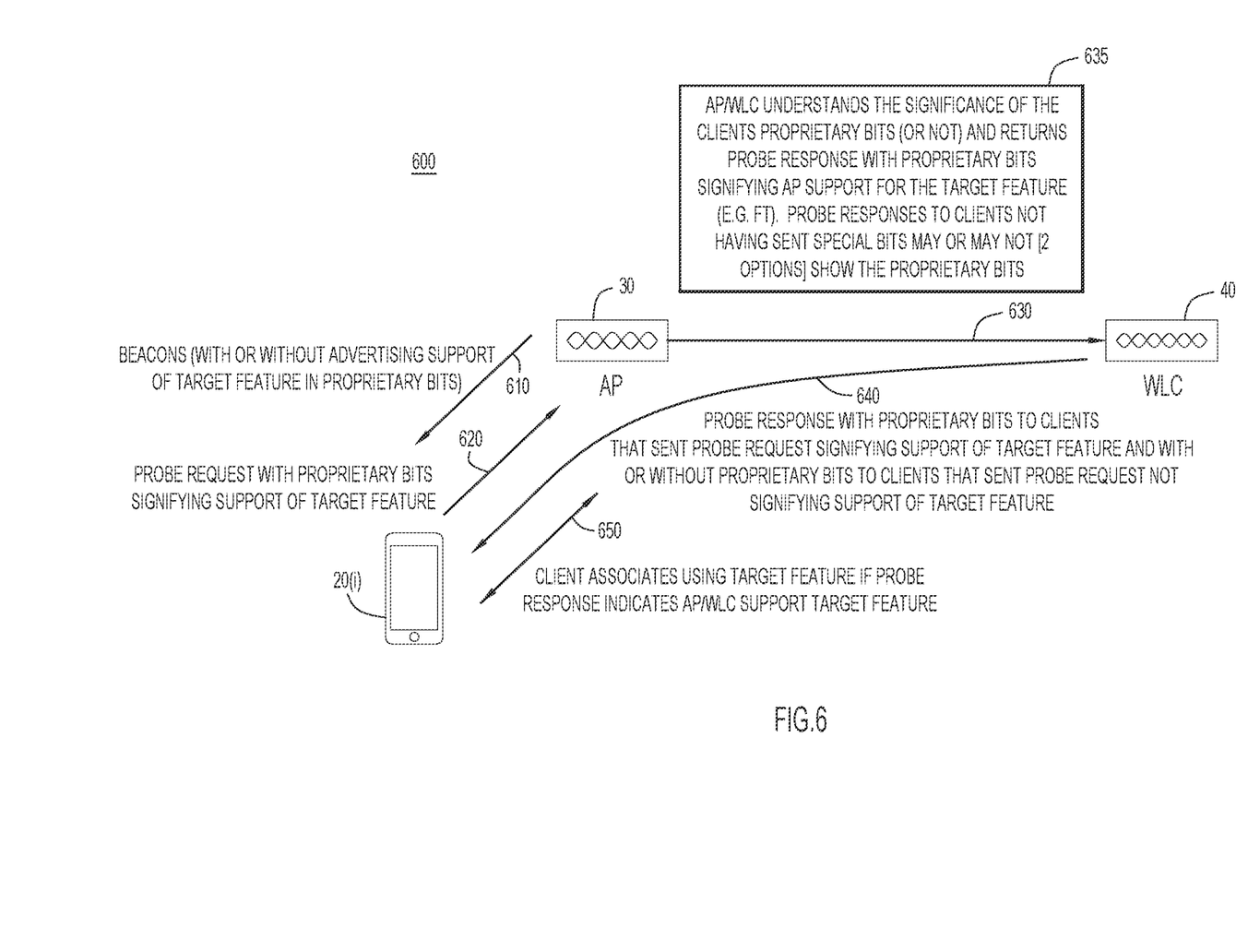
FIG. 6 is a diagram depicting an operational flow of a fifth adaptive feature enabling mechanism, according to an example embodiment.

Turning now to FIG. 6, a process 600 according to still another embodiment is shown. In this embodiment, the client embeds a vendor-specific information element in its Probe Requests. Bits in this information are set to signify support for the target feature. The AP recognizes these bits. However, the AP Probe Response does not directly mention support for the target feature. Instead, the AP embeds in its Probe Response a vendor-specific information element. Bits in this information element are set to signify support for the target feature. The client recognizes these bits, then implements a slight deviation from the 802.11 standard, and still invokes the target feature (e.g., undergoes an FT association), having recognized that the AP does support the target feature. In this case, the proprietary information present in the Probe Response may or may not also be included in the Beacon.

Thus, the operational flow in FIG. 6 is as follows. At 610, the AP 30 advertises, or does not advertise, support for the target feature with proprietary bits in the Beacons that it transmits. If the AP does advertise support for the target feature, the AP does not advertise it in standard 802.11 fields in Beacons (no FT mode in RSN information element, for example). If the AP does advertise support for the target feature, it does so with the proprietary information (vendor-specific information element) in its Probe Response and Beacons. The vendor-specific information element may take the form of that shown in FIG. 4 and described above, for example. At 620, the client that supports the target feature transmits a Probe Request that with proprietary bits to signify support for the target feature (e.g. FT). A client that does not support the target feature will transmit a Probe Request without the proprietary bits, regardless of whether the Beacons signified support of the target feature. At 630, the AP 30 forwards the Probe Request to the WLC 40. At 635, the AP/WLC detects and understands the significance of the proprietary bits (or not) included in the Probe Request and at 640 returns a Probe Response that includes proprietary bits signifying AP support for the target feature (e.g. FT) if the Probe Request contained the proprietary information signifying the client supports the target feature. Probe Responses to clients not having sent the special bits may or may not include the proprietary bits to signify support for the target feature. Thus, at 640, if the client sent a Probe Request signifying the client's support of the target feature, then the Probe Response will also signify the AP's/WLC's support of the target feature. On the other hand, if the client sent a Probe Request not signifying the client's support of the target feature, then the Probe Response may or may not signify the AP's/WLC's support of the target feature. In the latter case, it does not matter since the client will not know how to interpret the proprietary bits in the Probe Response. Thus, at 650, a client that signified support of the target feature in its Probe Request and received a Probe Response signifying the APs/WLC's support of the target feature will associate to the AP 30 using the target feature. A client that did not signify support of the target feature in its Probe Request will associate to the AP, but without using the target feature.

Figure 7:
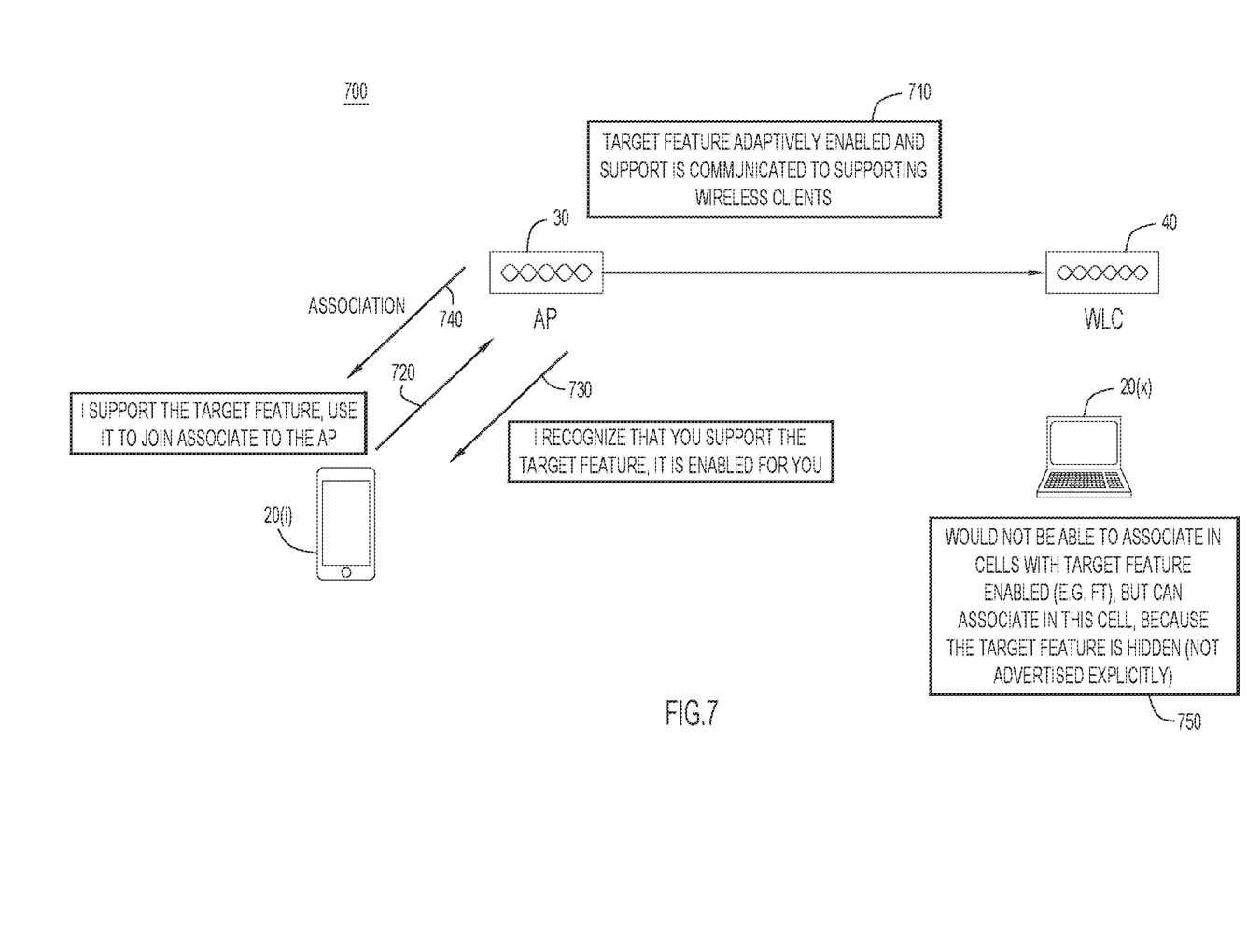
FIG. 7 is a diagram that generally illustrates the benefits the mechanisms presented herein, according to an example embodiment.

FIG. 7 depicts a flow 700 that generalizes the techniques depicted in FIGS. 2-6. At 710, the AP/WLC 30/40 adaptively enables the target feature and support of the target feature is communicated to supported clients. The communication to supporting clients may be by way of Beacons or Probe Responses. At 720, the client may signify its support of the target feature in its communications to the AP/WLC, e.g., in Probe Requests. At 730, the AP/WLC confirms that it recognizes that the client supports the target feature and signifies that it is enabled for the client. Again, this communication at 730 may be part of a Probe Response. Thereafter, the client associates to the AP at 740, either using the target feature, or not using the target feature, depending on whether the client and the AP/WLC mutually signify their support for the target feature.

FIG. 7 also shows at 750 that a client 20(x) that does not support the target feature can associate to the AP 30 in this cell because the target feature is hidden or otherwise not advertised explicitly such that clients that do not support the feature will nevertheless proceed to associate to the AP 30.

In summary, presented herein are several mechanisms to allow clients that support a target WLAN feature (e.g., FT) to invoke that feature in the WLAN (e.g., associate with FT parameters), even when the WLAN infrastructure (AP and/or WLC) does not directly announce (in the standard compliant manner) support for the target feature in Bacons (and in some cases in the Probe Responses). This allows supporting clients to benefit from the target feature, without the risk where, the target feature being openly advertised by the AP, older (legacy) clients not supporting the target feature would fail to associate to the AP. The legacy clients do not detect the target feature being advertised, and will associate in a legacy/standard compliant manner, e.g., using WPA2, while special mechanisms allow the AP to advertise support for the target feature individually to supporting clients, thus allowing a coexistence of supporting clients and non-supporting clients in the cell of the WLAN that the AP serves. Not all APs in a given WLAN deployment may support these mechanisms.

The advantages of these mechanisms include that network administrators can have the confidence that clients that support the target feature will benefit from a given target feature (e.g., a more efficient roaming mechanism), while older clients will not fail to join the cell because of the detection of an unsupported security mode, in the example where FT is the target feature.

In the case, of IEEE 802.11r/FT, the FT field mandates a security mechanism, and is positioned in a section of the frame that describes features that the client must be able to support. By contrast, the vendor-specific field is optional as per IEEE 802.11, and is ignored by clients not able to understand or implement its content.

Figure 8:
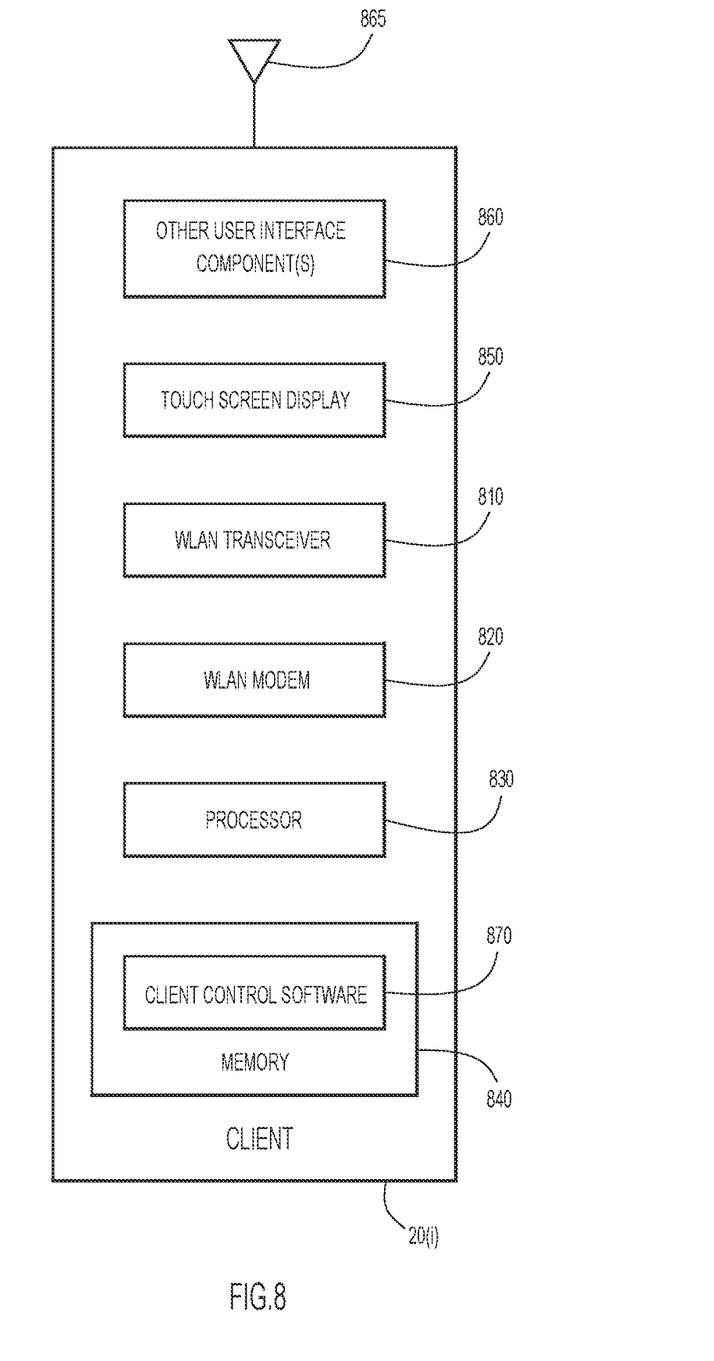
FIG. 8 is a block diagram of a wireless client device configured to participate in the mechanisms presented herein, according to an example embodiment.

FIG. 8 illustrates a block diagram of a client device 20(i) configured to participate in the mechanisms presented herein. The client 20(i) includes, among other components, a WLAN transceiver 810, WLAN modem 820, a processor 830, a memory 840, a touch screen display 850 and/or other user interface components 860, and one or more antennas 865. The WLAN transceiver 810 and WLAN modem 820 may be part of a WLAN chipset that consists of one or more application specific integrated circuits configured to support a WLAN standard, such as the IEEE 802.11 standard. The processor 830 may be embodied by one or more of a microprocessor or microcontroller. The memory 840 stores instructions for client control software 870 that, when executed by the processor 830, cause the processor 830 to perform the client-side functions that are part of the mechanisms described herein. The client control software 870 may be initially configured to support these client-side functions, or may be updated after product shipment to support these functions by a software update. Similarly, the WLAN modem 710 may be configured, at initial configuration of the client or by a firmware update to a client in the field, to support the client-side functions described herein.

Figure 9:
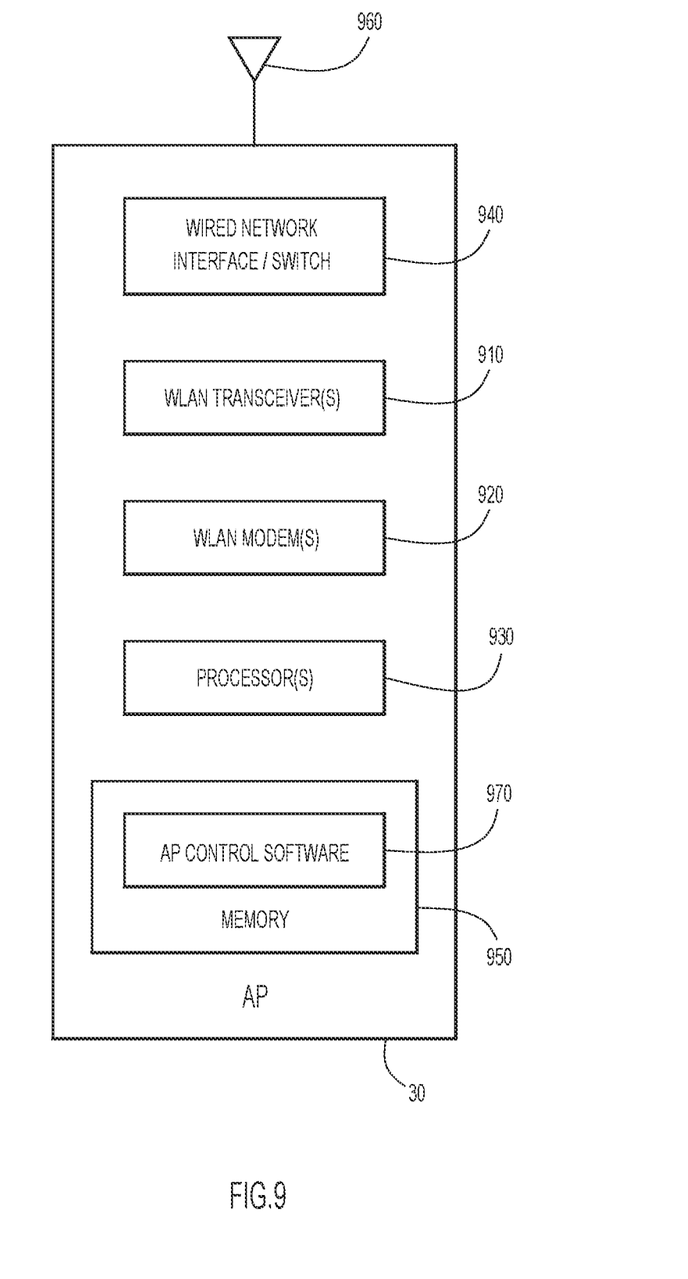
FIG. 9 is a block diagram of a wireless access point device configured to participate in the mechanisms presented herein, according to an example embodiment.

FIG. 9 illustrates a block diagram of an AP 30 configured to participate in the mechanisms described herein. The AP includes, among other components, one or more WLAN transceivers 910, one or more WLAN modems 920, one or more processors 930, a wired network interface (e.g., network interface card) or wired network switch 940, a memory 950 and one or more antennas 960. The one or more WLAN transceivers 910 and one or more WLAN modems 920 may be part of one or more WLAN chipsets that consists of one or more application specific integrated circuits configured to support a WLAN standard, such as the IEEE 802.11 standard. The memory 950 stores instructions for AP control software 970, that when executed by the one or more processors, cause the one or more processors to perform the AP-side operations as part of the mechanisms described herein.

Figure 10:
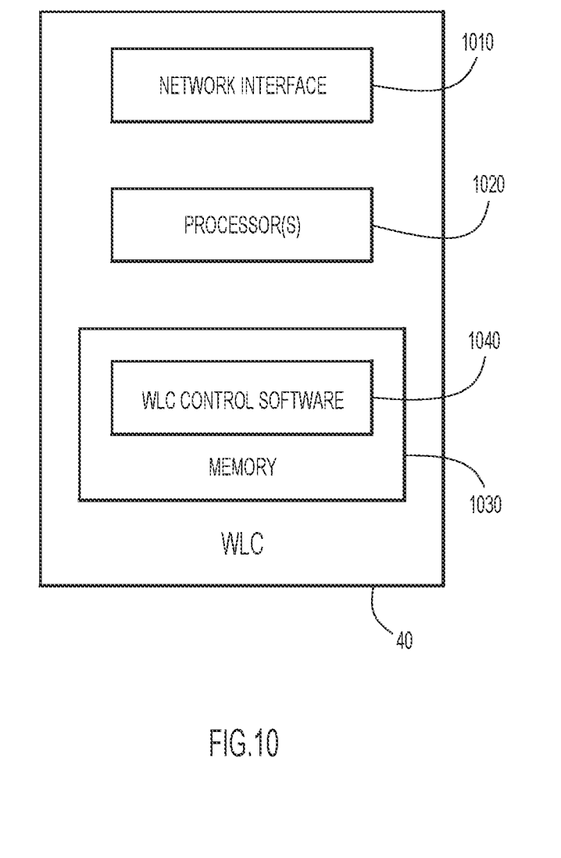
FIG. 10 is a block diagram of a wireless network controller configured to participate in the mechanisms presented herein, according to an example embodiment.

FIG. 10 illustrates a block diagram of a WLC 40 configured to participate in the mechanisms described herein. The WLC 40 includes one or more network interfaces (e.g., network interface cards) 1010, one or more processors 1020 and a memory 1030. The memory 1030 stores instructions for WLC control software 1040, that when executed by the one or more processors, cause the one or more processors to perform the WLC-side operations as part of the mechanisms described herein.

The memory shown in FIGS. 8-10 may take the form of read only memory (ROM), random access memory (RAM), magnetic disk storage media devices, optical storage media devices, flash memory devices, electrical, optical, or other physical/tangible memory storage devices. Thus, in general, the memory may comprise one or more tangible (non-transitory) computer readable storage media (e.g., a memory device) encoded with software comprising computer executable instructions and when the software is executed (by the controller) it is operable to perform the operations described herein.

To summary, the techniques presented herein provide for an adaptive process, where a wireless network (e.g., WLAN) target feature is enabled dynamically based on either dynamic identification of target feature support on the client (based on client OUI, prior learning and/or a database storing data indicating support), dynamic client testing (feature-enabled Probe Response), or specific optional bits present in either the client Probe request or the AP Beacons/Probe Responses (serving as a 'secret handshake'). These mechanisms detect and enable the target feature without disrupting the clients that do not support the target feature.

To summarize, in one form, a method is provided comprising: in a wireless network, an access point or wireless network controller adaptively enabling a wireless network feature without advertising support for the wireless network feature in a wireless network-standard compliant manner to allow one or more wireless clients that support the wireless network feature to use the wireless network feature when associated to the access point while enabling association of one or more wireless clients that do not support the wireless network feature.

In one example, the adaptively enabling includes: receiving a probe request from a wireless client; evaluating data contained in the probe request to determine whether the wireless client supports the wireless network feature; enabling wireless network connectivity with the wireless network feature for the wireless client if it is determined based on the evaluating that the wireless client supports the wireless network feature; and enabling wireless network connectivity without the wireless network feature for the wireless client if it is determined based on the evaluating that the wireless client does not support the wireless network feature.

In one example, the data is part (e.g., OUI) of a Media Access Control address of the wireless client that is included in the probe request, and wherein evaluating includes determining whether the data is contained in database of data identifying clients that support the wireless network feature. In another example, the data is one or more parameters contained in one or more fields of the probe request that distinguish the wireless client as a type of wireless client that supports the wireless network feature. In still another example, the data is one or more bits included in a specific information element of the probe request. In one example, the access point transmits to the wireless client a probe response that includes information signifying support for the wireless network feature when the presence of the one or more bits in the specific information element of the probe request is detected, or transmits to the wireless client a probe response that does not include the information signifying support for the wireless network feature when the one or more bits in the specific information element of the probe request is not detected.

In general, the access point may broadcast beacons that do not advertise support for the wireless network feature, in connection with the embodiments described.

Enabling wireless network connectivity with the wireless network feature for the wireless client may include transmitting to the wireless client a probe response that includes information signifying support of the wireless network feature. Conversely, enabling wireless network connectivity without the wireless network feature for the wireless client includes transmitting a probe response that does not include information signifying support of the wireless network feature.

In one example, the access point broadcasts beacons that advertise support for the target feature in a specific information element of the beacons, and/or transmits probe responses that include the specific information element, that wireless clients which support the wireless network feature are capable of recognizing.

In another form, an apparatus is provided comprising a wireless transceiver configured to transmit and receive wireless signals in a wireless local area network; a processor coupled to the wireless transceiver, wherein the processor is configured to adaptively enable a wireless network feature without advertising support for the feature in a wireless network-standard compliant manner to allow wireless clients that support the wireless network feature to use the wireless network feature while permitting connectivity of wireless clients that do not support the wireless network feature.

In still another form, a system is provided comprising: a plurality of wireless clients; at least one access point configured to provide wireless network connectivity for the plurality of wireless clients; and a wireless network controller configured to communicate with the at least one access point; wherein the access point or wireless network controller is configured to adaptively enable a wireless network feature without advertising support for the wireless network feature in a wireless network-standard compliant manner to allow one or more wireless clients that support the wireless network feature to use the wireless network feature when associated to the access point while enabling association of one or more wireless clients that do not support the wireless network feature.

In still another form, one or more computer readable storage media encoded with software comprising computer executable instructions and when the software is executed operable to perform operations including: in a wireless network, an access point adaptively enabling a wireless network feature without advertising support for the wireless network feature in a wireless network-standard compliant manner to allow one or more wireless clients that support the wireless network feature to use the wireless network feature when associated to the access point while enabling association of one or more wireless clients that do not support the wireless network feature.

In various embodiments presented herein, the wireless clients are configured to perform operations not heretofore known to enable the adaptive wireless network feature enablement techniques. For example, a wireless client may transmit a probe request that includes one or more bits in a specific information element to signify that the wireless client supports a particular wireless network features.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
adaptively enabling, by a network device, a wireless network feature such that the wireless network feature is enabled for one or more first wireless client devices that support the wireless network feature and is hidden from one or more second wireless client devices that do not support the wireless network feature,
wherein the wireless network feature is one or more of a fast transition association network feature of a wireless network or a security related wireless network feature.

2. The method of claim 1, wherein the wireless network feature is the fast transition association network feature of the wireless network.

3. The method of claim 1, wherein the wireless network feature is the security related wireless network feature.

4. The method of claim 1, wherein the wireless network feature is associated with a security mode for the wireless network.

5. The method of claim 1, wherein the wireless network feature is incompatible with a mode of the one or more second wireless client devices.

6. The method of claim 1, wherein the network device is one of a wireless access point or a wireless network controller and the network device does not include a specific informational element that indicates support of the wireless network feature from the one or more second wireless client devices.

7. The method of claim 1, wherein enabling the wireless network feature includes:
obtaining a probe request from a wireless client device;

determining whether the wireless client device supports the wireless network feature based on the probe request;

enabling wireless network connectivity with the wireless network feature for the wireless client device based on determining that the wireless client device supports the wireless network feature; and enabling the wireless network connectivity without the wireless network feature for the wireless client device based on determining that the wireless client device does not support the wireless network feature.

8. The method of claim 7, wherein enabling includes:

enabling the wireless network connectivity without the wireless network feature by providing one or more probe responses that do not include information signifying support of the wireless network feature.

9. The method of claim 1, further comprising:

broadcasting, from the network device, one or more beacons without advertising support for the wireless network feature such that the wireless network feature is hidden from the one or more second wireless client devices when advertising a respective network and when associating with the network device to access the respective network.

10. An apparatus comprising:

a wireless transceiver configured to transmit and receive wireless signals in a wireless local area network; and a processor coupled to the wireless transceiver, wherein the processor is configured to adaptively enable a wireless network feature such that the wireless network feature is enabled for one or more first wireless client devices that support the wireless network feature and is hidden from one or more second wireless client devices that do not support the wireless network feature, wherein the wireless network feature is one or more of a fast transition association network feature of the wireless local area network or a security related wireless network feature.

11. The apparatus of claim 10, wherein the wireless network feature is the fast transition association network feature of the wireless local area network.

12. The apparatus of claim 10, wherein the wireless network feature is the security related wireless network feature.

13. The apparatus of claim 10, wherein the wireless network feature is associated with a security mode for the wireless local area network.

14. The apparatus of claim 10, wherein the wireless network feature is incompatible with a mode of the one or more second wireless client devices.

15. The apparatus of claim 10, wherein the processor is further configured to not include a specific informational element that indicates support of the wireless network feature from the one or more second wireless client devices.

16. The apparatus of claim 10, wherein the processor is configured to enable the wireless network feature by:

obtaining a probe request from a wireless client device;

determining whether the wireless client device supports the wireless network feature based on the probe request;

enabling wireless network connectivity with the wireless network feature for the wireless client device based on determining that the wireless client device supports the wireless network feature; and enabling the wireless network connectivity without the wireless network feature for the wireless client device based on determining that the wireless client device does not support the wireless network feature.

17. A system comprising:

a plurality of wireless client devices; and at least one network device that is configured to adaptively enable a wireless network feature such that the wireless network feature is enabled for one or more first wireless client devices that support the wireless network feature and is hidden from one or more second wireless client devices that do not support the wireless network feature, wherein the wireless network feature is one or more of a fast transition association network feature of a wireless network or a security related wireless network feature.

18. The system of claim 17, wherein the wireless network feature is the fast transition association network feature of the wireless network.

19. The system of claim 17, wherein the wireless network feature is the security related wireless network feature or is associated with a security mode for the wireless network.

20. The method of claim 1, wherein the wireless network feature is advertised in an optional field of a beacon or an optional filed of a response that is transmitted from the network device.

* * * * *